March 25, 1924.
O. F. GIFFIN
VALVE STEM COVER
Filed Sept. 21, 1922
1,487,932
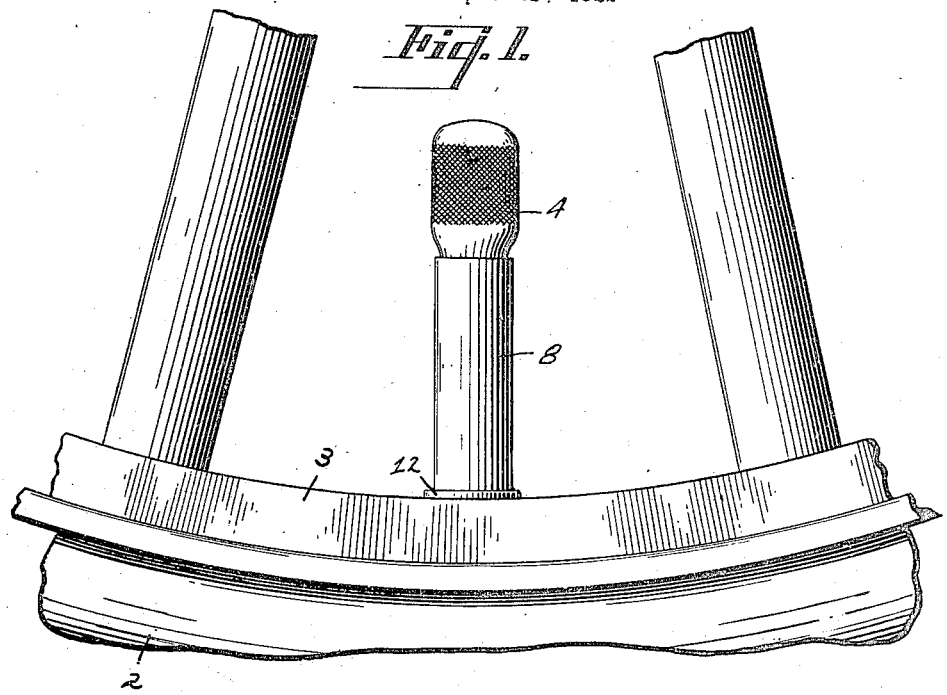
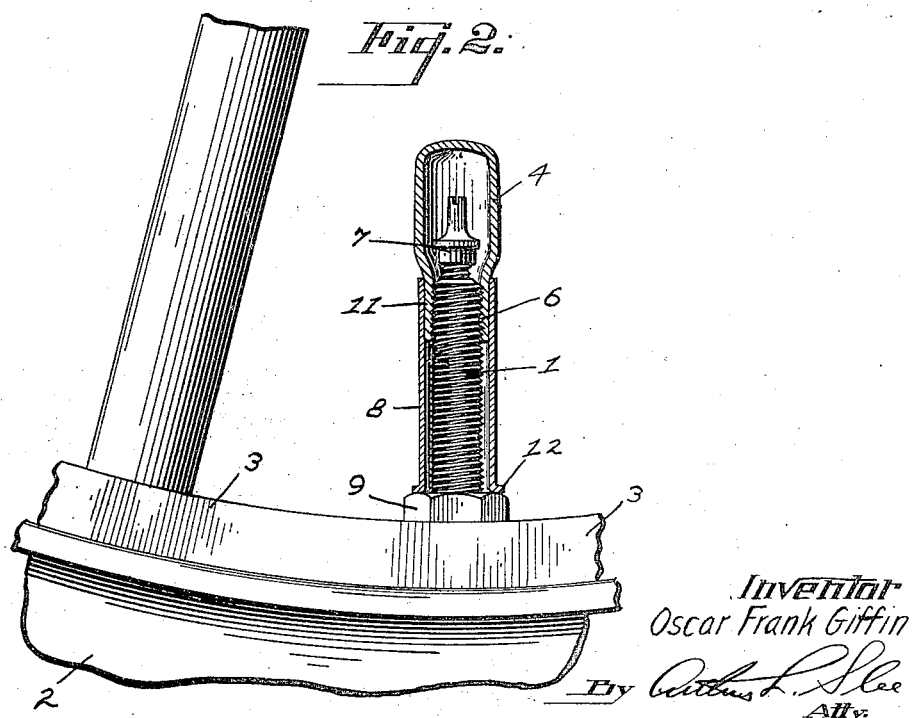
Inventor
Oscar Frank Giffin Patented Mar. 25, 1924.

1,487,932

UNITED STATES PATENT OFFICE.

OSCAR FRANK GIFFIN, OF SAN FRANCISCO, CALIFORNIA.

VALVE-STEM COVER.

Application filed September 21, 1922. Serial No. 589,677.

*To all whom it may concern:*

Be it known that I, OSCAR FRANK GIFFIN, a citizen of the United States, residing in the city and county of San Francisco and State of California, have invented a new and useful Improvement in a Valve-Stem Cover, of which the following is a specification.

My invention relates to improvements in tire valve covers and the like wherein a cap member is provided with an extension arranged to enclose a valve stem.

The primary object of my invention is to provide an improved tire valve cover.

Another object of my invention is to provide an improved cover arranged to enclose the entire outwardly extending portion of a tire valve, but threaded only onto the outer end thereof, whereby a material saving in time may be accomplished in applying and removing the cover.

A further object is to provide an improved cover which may be readily adapted for use with valve stems extending various distances through the rims of wheels.

I accomplish these and other objects by means of the device disclosed in the drawing forming a part of the present specification wherein like characters of reference are used to designate similar parts throughout said specification and drawing, and in which:

Fig. 1 is a broken side elevation of a portion of an automobile wheel showing my improved cover applied upon the valve stem carried thereon.

Fig. 2 is a similar view, the cover being shown in vertical section.

Referring to the drawings the numeral 1 is used to designate in general a valve stem carried by a tire 2 upon a wheel 3 of an automobile or the like, not shown. My invention consists of a cover arranged to enclose the stem 1, said cover consisting of a cap portion 4 having one end thereof open and internally threaded as at 6 to engage the threads upon the outer end of the valve stem 1 whereby said cap portion may be mounted to enclose the valve cap 7 carried upon said stem. It will be noted that the cap portion 4 is arranged to engage only a limited number of the threads at the outer end of the stem, the importance of which fact will hereinafter be more fully explained.

The cap portion 4 carries a tubular extension 8 adapted to fit over the valve stem and enclose the portion of said stem between the cap portion and the rim of the wheel, the threading of the portion 4 upon the outer end of the stem 1 serving to advance the extension 8 into firm engagement with the rim of the wheel or against the nut 9 sometimes applied upon the stem 1 and bearing against the rim as shown in the drawings.

In the preferred construction disclosed in the drawings the cap portion 4 is provided with a reduced extension 11 at the open end thereof, the inner surface of said extension being threaded as above described. In this construction the extension is made a separate element consisting of a tubular member arranged to fit over the reduced extension 11 and to be normally held in engagement therewith by frictional engagement between the inner surface of the tubular member and the outer surface of the reduced portion 11. The tubular member 8 may be made of any desired length so that the end remote from the cap portion 4 will be firmly pressed against the wheel 3 as shown in Fig. 1, or against the nut 9, as shown in Fig. 2, when said cap portion has been advanced to engage the desired number of threads upon the outer end of the stem 1. The extension 8 is flanged as at 12 to provide increased bearing surface and to add to the strength of the cover.

In operation my invention is as follows: A cap portion 4 fitted with a tubular extension 8 of the desired length, is threaded onto the outer end of the valve stem in the usual manner. When the portion 4 has been advanced a few turns the extension will be tightened between the cap and the rim of the wheel with sufficient pressure to prevent the inadvertent unscrewing of the cover. As only the threads at the extreme outer end of the stem are engaged by the cap it will be readily seen that only a few turns will be necessary to place the cover in operative position with the valve cap 7 enclosed in the cap portion 4 and the stem enclosed in the extension 8, thus avoiding the necessity of screwing the threaded portion the entire length of the stem as has heretofore been the common practice with covers of the type in general usage, and thereby materially facilitating the application of the cover and effecting a material saving in time. When it is desired to remove the cover, a few turns in the reverse direction will move the threaded portion of the cap out of engagement with the threads of the stem and the cover then may be freely lifted away from the stem, thus effecting a similar saving of time and avoiding the inconvenience of screwing the cap the entire length of the exposed portion of the stem.

As valve stems do not always extend the same distance through the rims of wheels, it is often desirable to have covers of different lengths. This is readily accomplished by the preferred construction shown in the drawings wherein a tubular member 8 of any desired length may be applied upon a cap portion 4 of standard dimension. In commercial practice it is desirable to provide members 8 of standard diameter but of varied lengths so that an original order may be filled with a desired length of extension and if later found necessary extension members 8 of other lengths furnished for use with the original cap portion.

From the above description it will be readily seen that I have provided a valve stem cover of an improved construction which will materially facilitate the application and removal of the cover and which may be readily adapted for use with valves and wheels of various sizes. While I have illustrated and described what I now consider to be the preferred construction of my invention, I do not desire to restrict myself to the precise disclosure made, but wish to avail myself of all modifications which may be made thereto without departing from the terms of the appended claims.

Having thus described my invention, what I claim as new and desire to secure by Letters Patent, is:

A valve stem cover for automobile tire valves and the like comprising a cap portion; a reduced extension formed upon said cap portion, said extension being internally threaded to engage the threads at the outer end of a valve stem; and a tubular member engaging said reduced extension and arranged to extend between said cap portion and a wheel to enclose the valve stem.

In witness whereof I hereunto set my signature.

OSCAR FRANK GIFFIN.